Patented Dec. 8, 1931

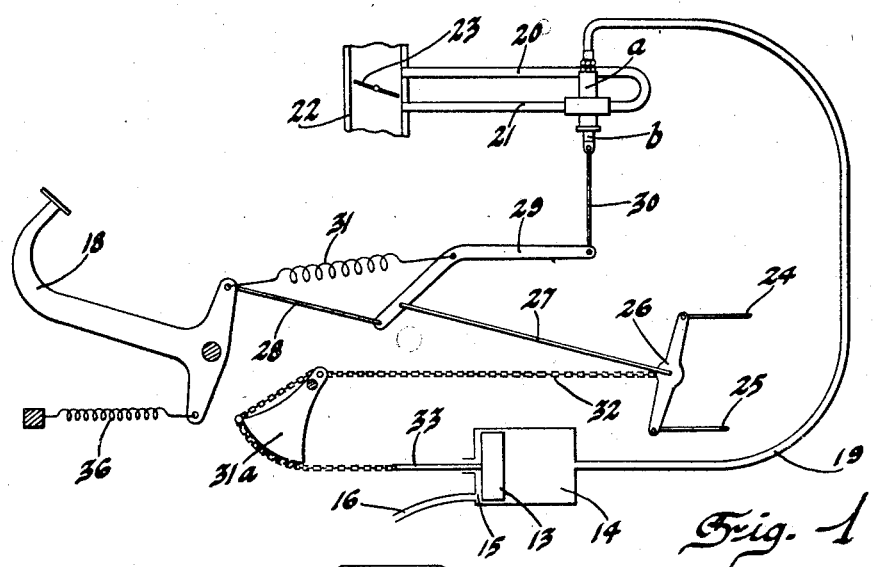
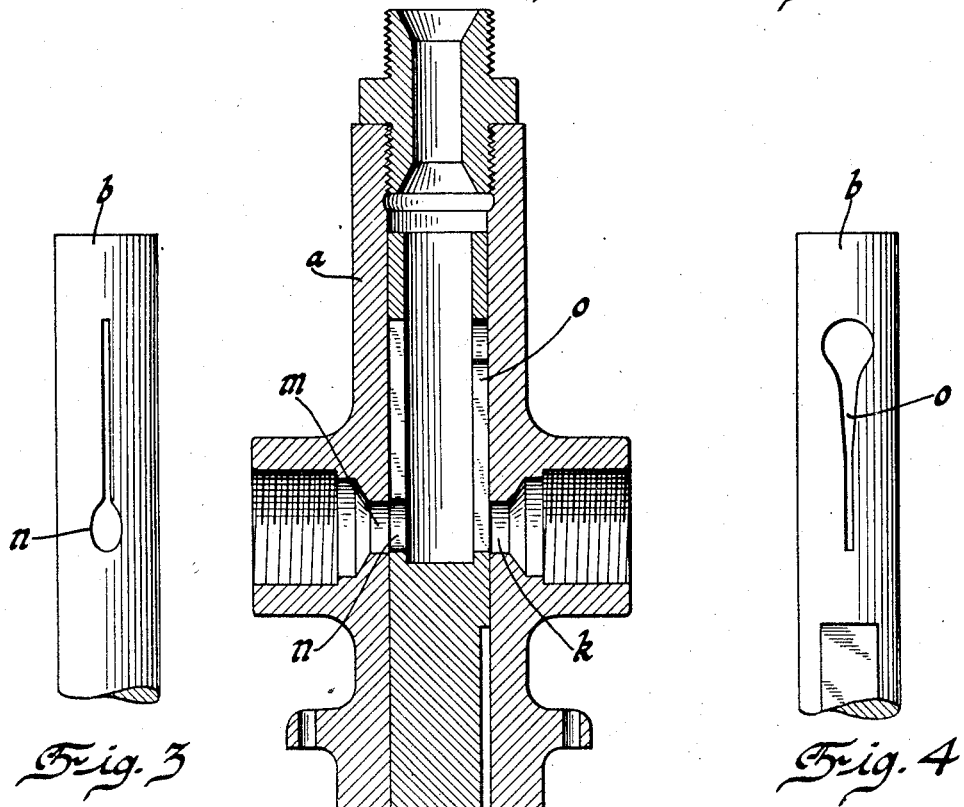

1,835,222

UNITED STATES PATENT OFFICE

WILLIAM O. KENNINGTON, OF LONDON, ENGLAND, ASSIGNOR TO GENERAL MOTORS CORPORATION, OF DETROIT, MICHIGAN, A CORPORATION OF DELAWARE

VACUUM BRAKE

Original application filed November 8, 1926, Serial No. 147,130, and in Great Britain November 13, 1925. Divided and this application filed May 25, 1927. Serial No. 194,128.

This application relates to brakes or other mechanism operated from the suction obtainable from the induction system of internal combustion engines and has for its object to provide improved or simplified means of controlling the suction which is applied to the brake or other contrivance to be operated thereby (hereinafter termed the "pneumatic contrivance").

I have already proposed in my United States patent for vacuum operated brake, No. 1,541,266, dated June 9, 1925, to produce the progressive operation of a pneumatic contrivance for operating brakes for automobiles and the like by causing the throttle valve when moved beyond its normally closed position to vary the degree of suction applied to the pneumatic contrivance.

According to the present invention the pipe through which engine suction is applied to the pneumatic contrivance communicates with a space which itself is adapted to be controllably subjected to the engine suction, this space being located preferably in a bypass of the main induction pipe or system, the space serving as a conduit through which mixture for slow running can pass.

This application is filed as a division of my Patent 1,665,306 for brake mechanism operated by suction, dated April 10, 1928.

The accompanying drawings show a preferred arrangement in which the inventive idea may be embodied. Referring to the drawings:

Figure 1 illustrates diagrammatically a preferred arrangement by which the vacuum operated mechanism is associated with a direct mechanical brake operating linkage.

Figure 2 is a vertical section through the valve used in the construction shown in Figure 10.

Figures 3 and 4 are two views in elevation of details associated with the valve.

In the drawings the pedal is coupled through a lost motion device to mechanism for moving the valve controlling the suction, thus enabling application of the brakes to be augmented positively or enabling them to be operated should any failure in the suction system arise or should the engine be at rest.

An example of this arrangement is illustrated in Figures 1 to 4 inclusive in which 18 represents a brake pedal, 13 a pneumatic cylinder, the release side 15 of which is connected by a pipe 16 to the engine crank case, not shown. The operative side is connected by a pipe 19 to a control chamber $a$ and connections are also made from the latter by pipes 20, 21 to the induction pipe 22 on opposite sides of the throttle 23. Brake rods 24, 25 are connected to an equalizer bar 26, which is coupled to a brake pedal 18 by rods 27 and 28. A floating crank lever 29 is pivoted to these rods 27 and 28 adjacent one end and is connected with a control space plunger or sleeve $b$ by pivotal link 30 as shown. A tension spring 31 is connected to the floating lever 29 and may be anchored to an arm of pedal 18 or at some other convenient point. To the equalizer bar 26 is also connected a chain 32 passing over a pivoted sector piece 31$a$ and coupled to the piston rod 33. A spring 36 is engaged with the pedal 18 and normally serves to hold it in released position.

In operation the parts normally occupy the position illustrated in Figure 1, the brakes being in released position. When the pedal is depressed in order to apply the brakes (the throttle 23 being closed) the spring 31 is or can be sufficiently stiff to prevent the crank lever 29 from rocking until the brakes are applied by manual effort alone. Further pressure on the pedal 18 causes the spring 31 to be extended, thus allowing the crank lever 29 to rock and thereby to withdraw the plunger $b$. This is arranged to apply engine suction through conduit 20, openings $k$ and $o$, and conduit 19 to chamber 14 according to the extent of plunger movement and the piston rod 33 moves to the right thus further applying the brakes by moving the equalizer bar 26 to the left. The total braking effort attained depends upon the amount of rocking of the lever 29 and thus upon the pressure applied to the brake pedal 18. The actual effort exerted is obtained partly from the piston rod 33 and partly by direct foot pressure. Foot pressure alone may be employed in event of the engine being at a stand still.

When plunger $b$ is in its innermost position, cylinder 14 is free to exhaust, through pipe 19, valve chamber $a$, openings $m$ and $n$, and conduit 21. When the plunger $b$ is drawn outwardly from part $a$, as explained above, the communication with the intake pipe below the throttle valve is reduced to a minimum and the suction of the manifold above the throttle valve is operative through openings $k$ and $o$ to reduce the pressure in cylinder 14.

In operation pedal 18 is pushed down against the resistance of its spring 36. The links 28 and 27 both connected to floating lever 29 provide a direct mechanical brake application. Lever 29, owing to its spaced points of attachment, tends to swing clockwise and open the vacuum valve apparatus. Preferably the tension of spring 31 is such that the lever 29 has no rotary movement until after the direct mechanical application of the brake. It thus serves to retard the opening of the vacuum brake mechanism. As soon, however, as the resistance is encountered at the brake, lever 29 tends to turn about its pivotal connection with link 27, this movement being permitted by the extensible spring 31. This action opens the vacuum valve and chamber 14 to engine suction to an extent depending upon the degree of rotation of the lever 29. As the vacuum develops it causes a movement of piston rod 33 and of the brake member 26, the latter moving toward the left in Figure 1. This movement results in a thrust of lever 27 against lever 29 just above its pivotal connection with link 28. The added tension of spring 31 which permitted the suction to operate is tending to swing lever 29 in the same direction about the same pivot. Also the reduced pressure within the vacuum valve chamber $a$ is equivalent to a pull on rod 30. These several forces combine to turn lever 29 about its pivot with link 28 and partially close the suction valve until upon further movement of the pedal the several steps enumerated are repeated. Upon such further movement a greater tension is given the mechanical linkage and the vacuum brake valve opened somewhat more.

The vacuum valve, although consisting merely of a hollow plunger formed with a slotted portion movable in a tubular chamber becomes in effect when used with the linkage described substantially the functional equivalent of a reaction valve of the type well-known in superatmospheric brake installations. For practical purposes it functions substantially the same as such a valve and does away with the necessity of a plurality of valve parts, valve seats and springs commonly used. By suitable tensioning springs 31 and 36 the action of the pedal may be made such as to meet the wishes of any operator and to make the action of this type of brake very similar to the action of the brakes with which he may have been familiar. I prefer an adjustment wherein the mechanical application of the brake slightly precedes the vacuum actuation.

After a given movement of the pedal any further movements afford a more effective action of the suction brake but also put additional tension on the direct linkage with the result that the operator always has the feel on the pedal serving as a measure of the intensity of brake application.

Any tendency of a brake of this kind to lag, due to the time interval necessary to produce a condition of vacuum in chamber 14 is obviated by the linkage which permits the direct mechanical action to slightly precede the full effort of the vacuum brake. In this way the brake application is one of smooth deceleration and there is no grab and release effect as in some known types of brakes.

When the throttle is closed and the vacuum brake applied by opening the space $a$ to manifold suction, there is an abrupt decrease of the area of the passageway from duct $m$ to $a$ through the portion $o$. The opening is always sufficient, however, to supply enough mixture to keep the motor idling; and I may, and in practice I have found this desirable, so design the opening as to slightly speed up the motor during the time the vacuum brake is in action. This gives an added protection against the stopping of the engine.

I claim:

1. In a vacuum brake, an internal combustion engine having an induction pipe, a throttle valve therein, a brake cylinder, a valve chamber having a control space, means affording free communication between said space and said cylinder, said chamber having additionally a plurality of openings, a plurality of conduits affording communication from said space through said openings and to the induction pipe of the internal combustion engine at points above and below the throttle valve, a valve member movable in said valve chamber provided with means to variably control said openings.

2. The invention defined by claim 1, the openings for the connections of the conduits leading to the induction pipe being circumferentially spaced and the variably controlling means of said valve member being disposed adjacent said openings.

3. The invention defined by claim 1, said valve member being at one portion tubular in form its variable controlling means being constituted by slots of variable dimensions within its tubular walls to variably control the passages communicating with the induction pipe as the valve member is moved.

4. In a vacuum brake for a vehicle having an internal combustion engine with an induction pipe provided with a throttle valve, a valve chamber having a control space, a brake cylinder, said valve chamber having an opening for connection with the brake cylinder, and openings for connection with the induction pipe on opposite sides of the throttle valve.

5. The invention defined by claim 4, said valve chamber containing a plunger reciprocably mounted therein, said plunger having means to control simultaneously and oppositely the said openings to the induction pipe whereby there is a variable opening through which the suction of the induction pipe may communicate with the brake cylinder, and a constantly open restricted passage for the flow of explosive mixture around the throttle valve.

6. Suction controlled mechanism for brakes on a vehicle having an internal combustion engine with an induction pipe provided with a throttle valve, an auxiliary chamber, a single member therein having two ports, a pneumatic contrivance for actuating brakes, the space within said chamber being in constant communication with said contrivance, said member being movable to afford variable communication between said space and either side of said throttle valve.

7. In a combined mechanical and vacuum brake, a manually operable member, linkage connected to said member for direct mechanical brake operation, said linkage including a floating lever and links connected at their adjacent ends to spaced points at one end of said floating lever, a brake-operating cylinder, a valve having a movable part for variably opening the passage from a source of sub-atmospheric pressure to said brake cylinder, and means connecting said movable valve member with the other end of said floating lever, together with yielding means connected to said floating lever, said yielding means preventing the lever from actuating the valve during the first part of the movement of the manually operable member, said yielding means thereafter yielding as the manually operable member renders the valve operable, the extent of yielding serving as a measure of the effectiveness of the vacuum brake.

8. Suction controlled mechanism for a vehicle having an internal combustion engine with an induction pipe equipped with a throttle valve, said mechanism comprising an auxiliary chamber, valve means therein, said chamber constituting a control space, a pneumatic contrivance for operating brakes, conduit means affording a permanent communication between said space and said contrivance, a plurality of conduits affording communication between said space and each side of said throttle valve, means connected to said valve member to move the same within the said chamber operable to place said space in communication with the induction pipe on either side of said throttle valve.

9. In a combined mechanical and vacuum brake, a manually operable member, linkage connected to said member for direct mechanical brake operation, said linkage including a floating lever and links connected at their adjacent ends to spaced points at one end of said floating lever, a brake-operating cylinder, a valve having a movable part for variably opening a passage from a source of sub-atmospheric pressure to said brake cylinder, means connecting said movable valve member with the other end of said floating lever, said valve having openings constituting a part of said passage; an engine manifold, a throttle therein, the portion of said manifold above said throttle constituting said source of said sub-atmospheric pressure, and another opening in said valve and a conduit from said other opening to a part of said manifold below said throttle.

In testimony whereof I affix my signature.

WILLIAM O. KENNINGTON.